United States Patent [19]
Kingsford

[11] Patent Number: 5,575,311
[45] Date of Patent: Nov. 19, 1996

[54] THREE-WAY POPPET VALVE APPARATUS

[75] Inventor: Kenji Kingsford, Devore, Calif.

[73] Assignee: Furon Company, Laguna Niguel, Calif.

[21] Appl. No.: 372,457

[22] Filed: Jan. 13, 1995

[51] Int. Cl.$^6$ ................................................. F16K 11/044
[52] U.S. Cl. .................... 137/625.5; 251/129.17
[58] Field of Search ............................ 137/625.27, 625.5; 251/129.17

[56] References Cited

U.S. PATENT DOCUMENTS

| Re. 34,261 | 5/1993 | Sule | 137/625.5 |
| 3,329,165 | 7/1967 | Lang | 137/625.5 |
| 3,587,156 | 6/1971 | Sorenson | 29/156.7 |
| 4,108,205 | 8/1978 | Hawley | 137/554 |
| 4,880,033 | 11/1989 | Neff | 137/625.65 |
| 5,002,086 | 3/1991 | Linder et al. | 137/312 |
| 5,261,442 | 11/1993 | Kingsford et al. | 137/312 |
| 5,345,857 | 9/1994 | Murphy | 251/129.17 X |

Primary Examiner—Gerald A. Michalsky
Attorney, Agent, or Firm—Christie, Parker & Hale, LLP

[57] ABSTRACT

A valve apparatus for distributing flow from an inlet among either of two outlets consists of essentially four components comprising a valve body, a second valve seat, a poppet assembly, and an actuator assembly. The valve body comprises an inlet port and two outlet ports disposed between a top end and a bottom end of the body. The inlet and outlet ports communicate with a centrally located valve chamber. A first valve seat is integral with the body and is disposed in the chamber between the inlet port and the second outlet port. A second valve seat is formed separately from the body and is disposed within the chamber between the inlet port and the first outlet port. A poppet assembly is disposed within the chamber and comprises an enlarged diameter section integral with a valve stem positioned between opposing top and bottom ends of the stem. The enlarged diameter section comprises an upper shoulder adjacent the second valve seat and a lower shoulder adjacent the first valve seat. A diaphragm is integral with the stem and positioned at the top end of the body. Actuating means displace the poppet assembly between a first position and second position within the valve chamber effecting flow to the first and second outlets, respectively.

27 Claims, 8 Drawing Sheets

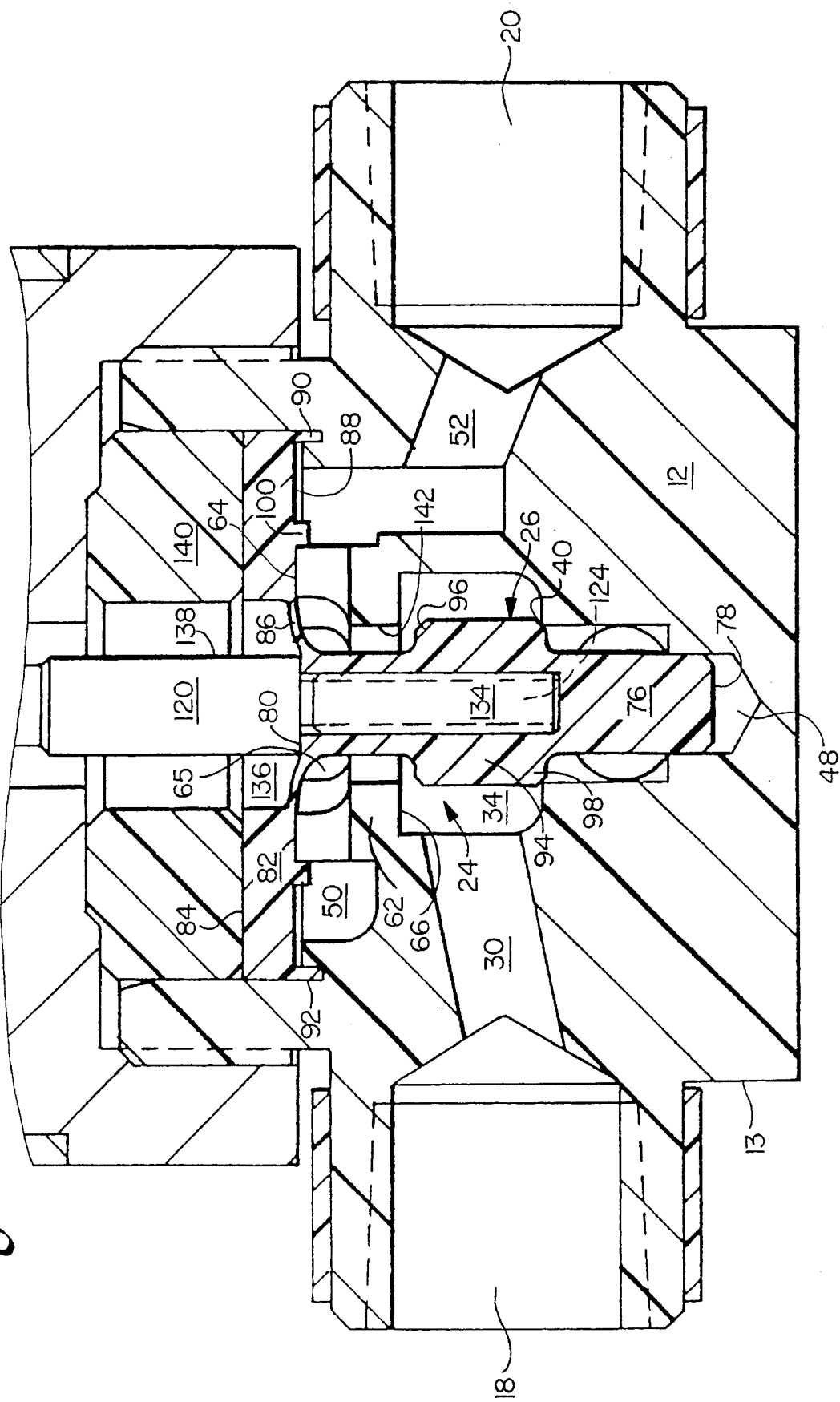

THREE-WAY POPPET VALVE APPARATUS

FIELD OF THE INVENTION

This invention relates to valves which can be used with corrosive liquids without valve component degradation and with chemically pure liquids without deleteriously affecting the liquids; and more specifically, to valves that incorporate the use of a poppet to control the distribution of liquid through the valve.

BACKGROUND OF THE INVENTION

Various types of fluid flow control valves are used in applications where the valve internals are subjected to corrosive acidic or caustic liquids, or where the purity of the liquids which flow through the valve must be maintained. An example of such application is the semi-conductor manufacturing industry where process chemicals distributed through a control valve must maintain a high degree of chemical purity to avoid contamination that may occur on the microscopic level. Such valves are either constructed of relatively inert materials, e.g., fluoropolymers or other polymeric materials, or the valve surfaces which come into contact with the flowing liquids or which potentially can come into contact with the liquids, are coated with such inert materials.

Fluid flow control valves known in the art are commonly biased into the closed position by a spring force and are opened by means of a solenoid actuator, or actuator means operated by pneumatic or hydraulic pressure and the like. Valve closure springs typically used in such valves are made from a metallic material and configured to afford a resilient action. Such fluid control valves also include at least one, and more commonly two diaphragms disposed within the valve chamber of the valve. Each diaphragm is placed into contact with the fluid and serves to prevent the escape of the fluid from the valve chamber into the valve operating mechanism and into the environment. A valve stem is disposed axially within the chamber and each diaphragm is attached to an opposite end of the valve stem. Each diaphragm comprises a peripheral edge portion that is engaged against an adjacent wall portion of the valve body at each opposite end of the valve body.

The valve closure springs are typically placed adjacent a surface of the valve diaphragm that is not exposed to the process fluid distributed through the valve. The distribution of the process fluid through the valve is controlled by the actuation of the valve stem within the chamber against valve seats. The movement of the valve stem is accommodated in part by the controlled deformation of the diaphragms. Control valves constructed in this manner are prone to failure due to both the possibility of eventual diaphragm rupture and to the large number of leak paths inherent in such construction. A valve constructed in this manner has four leak paths or potential passages through which fluid within the valve chamber can escape into the valve operating mechanism or the environment. Two leak paths comprise the attachment points between the diaphragms and each opposite end of the valve stem, and the other two leak paths comprise the seal between the peripheral edge of each diaphragm and the valve body walls.

Diaphragm rupture or leakage though any one of the leak paths is not desirable because the process chemical directed through the valve chamber may be allowed to escape into the valve body where the corrosive or caustic chemical can come into contact with the valve springs, and thereby provide a source of ionic contamination to the process chemical to pass on to other downstream chemical processing units. Alternatively, diaphragm rupture or leakage may result in the escape of the process chemical from the valve chamber, through the valve body and onto the ground or into the atmosphere, where the particular process chemical may cause a hazard to the environment or a health danger to nearby operators.

U.S. Pat. No. 3,329,165 discloses a solenoid-operated multi-way valve comprising an actuating rod that extends through a poppet valve element. The poppet valve element is disposed axially within a central valve chamber in communication with three liquid ports. The central valve chamber is formed from a valve body made up of four stacked valve body members held in place by a screw type fastener. The poppet valve element comprises two coaxial conical faces that are arranged between opposing valve seats within the valve chamber. The axial movement of the valve poppet element within the valve chamber controls the flow of liquid through the valve to two of the three valve ports, depending on whether the poppet is in communication with one or the other valve seat. The valve comprises metallic sealing rings at deformable diaphragm-like portions of the valve poppet at opposite ends to secure each valve poppet end to adjacent portions of the valve body.

The valve design of the above-referenced patent reduces the number of leak paths between the poppet valve element and the valve chamber to two, one at the interface between each deformable end portion of the valve poppet and the adjoining valve body. However, the design of using multiple valve body members to form the valve body and the valve chamber presents additional leak paths between adjoining valve body members that does not minimize the possibility of chemical leakage from the valve chamber into the environment. There also still exists the possibility for the introduction of ionic contamination into the chemical process upon failure of the poppet valve element by exposure of the leaking process chemical with the metal ring elements.

Additionally, the construction of such a valve requires a large amount of machining in order to configure the valve chamber, valve seats, and valve ports, thereby increasing the amount of time and labor needed to produce the valve and, thus increasing the cost of the valve as well.

In the handling of fluids where the chemical purity must be maintained to ensure the desired degree of quality for the product manufactured using such process fluids, it is desired that the fluid control valve be made in a manner that eliminates the possibility that contaminants may be introduced into the process caused by contact of the process fluid with elements of the valve during distribution therethrough. It is, therefore, desirable to provide a flow control valve for use in the distribution of process fluids or gases where a high degree of chemical purity is desired that will not introduce contamination into the process. It is desirable that the valve be made from material having a high degree of chemical resistance and thermal resistance to resist degradation through contact with corrosive or caustic chemicals and the like. It is desirable that the valve be constructed in a manner that results in the inherent reduction of leak paths, thereby minimizing the potential for chemical leakage into the environment. It is desirable that the valve be capable of operating at high temperatures and under high pressures without danger of valve failure or chemical leakage. It is also desirable that the valve is constructed using conventional manufacturing principles from available materials to reduce the cost of manufacturing such valve.

SUMMARY OF THE INVENTION

A valve apparatus for directing the flow of air or liquid through the valve to one of two different outlets consists of essentially four elements, a valve body, a second valve seat, a poppet assembly, and an actuator. The valve apparatus includes a one-piece valve body having a top end and a bottom end. An inlet port and first and second outlet ports are disposed between the valve body top and bottom ends. A valve chamber is centrally located in an axial position within the valve body. A first valve seat is formed integrally with the valve chamber, faces toward the valve body, and is located between the inlet port and the second outlet port. A second valve seat is formed separately from the valve body and is mounted in the valve chamber at a position above the first valve seat. The second valve seat faces the valve body bottom end and is located between the inlet port and the first outlet port.

A poppet assembly is formed separately from the valve body and is mounted for axial movement within the valve chamber. The poppet assembly includes a valve stem having an enlarged diameter section between its top and bottom end portions. A diaphragm is formed integrally with the valve stem top end and extends radially therefrom. The enlarged diameter section of the valve stem is located between the first and second valve seat and includes a lower shoulder for engaging the first valve seat when in a first axial position within the valve chamber. The enlarged diameter section also includes an upper shoulder for engaging the second valve seat when in a second axial position within the valve chamber. The valve apparatus also includes means for moving the poppet assembly between the first and second positions.

The valve body can be constructed using conventional molding or machining operations and is designed to reduce the total number of valve components, not including the actuating means, to three. Additionally, the reduction of valve components is accomplished by the construction of the poppet assembly having a diaphragm and extended diameter section integral with the valve stem. The valve apparatus constructed according to principles of this invention comprises only one leak path that minimizes the possibility of valve failure and, thus reduces the possibility of corrosive or caustic chemical leakage that can be hazardous to the environment and/or present a health hazard to nearby operators. The valve apparatus constructed according to principles of this invention also does not require the use of valve springs, thereby eliminating a source of ionic contamination to the process chemical.

BRIEF DESCRIPTION OF THE DRAWINGS

These and other features, aspects, and advantages of the present invention will be more fully understood when considered with respect to the following detailed description, appended claims, and accompanying drawings, wherein:

FIG. 9 is a schematic cross-sectional fragmentary side view of a valve body embodiment comprising an integral second valve seat.

DETAILED DESCRIPTION

Figure 1:
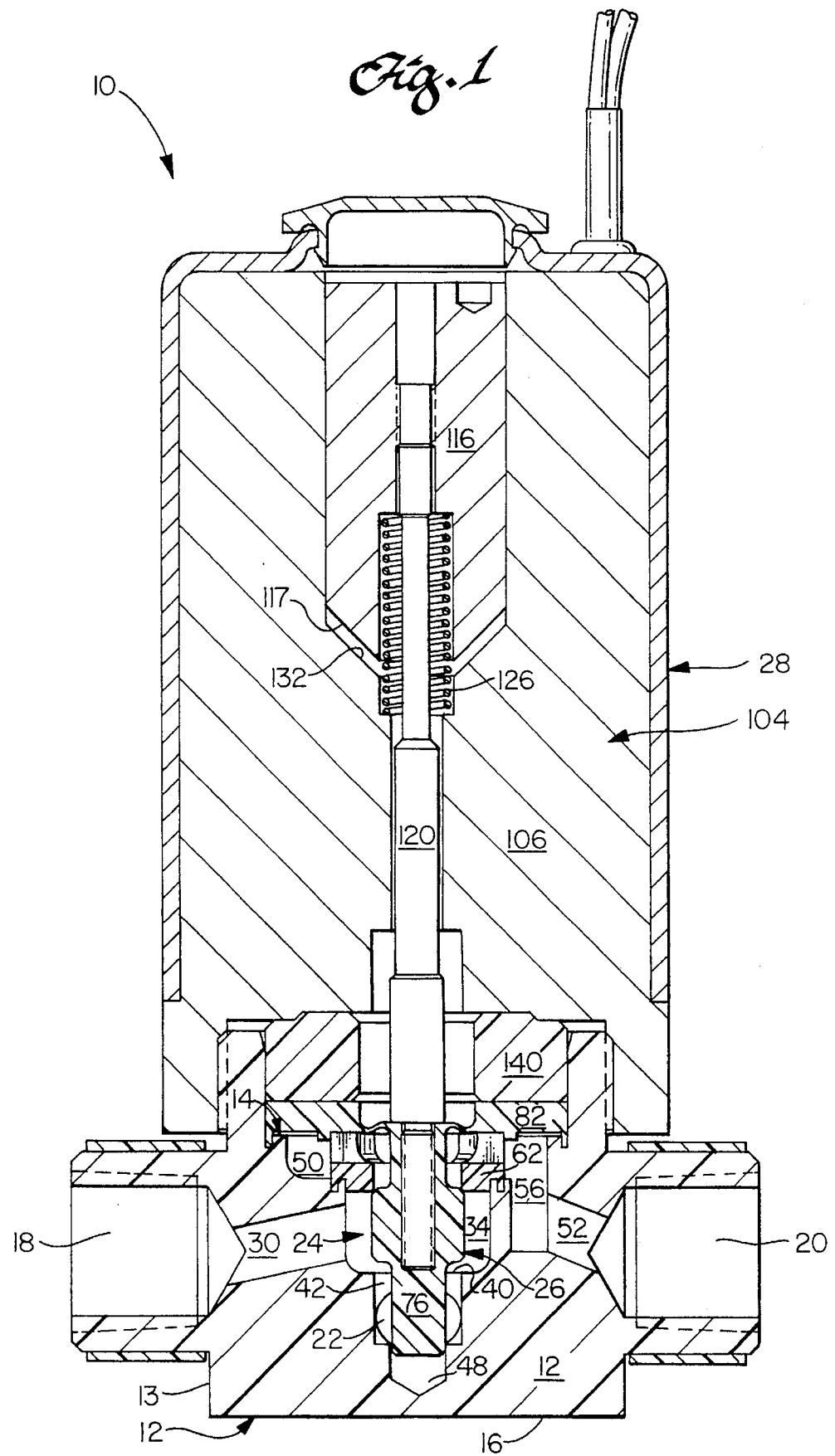
FIG. 1 is a semi-schematic cross-sectional side view of a preferred embodiment of the valve apparatus provided in accordance with practice of the present invention in a first operating condition for controlling the flow of corrosive or chemically pure liquids.
Figure 2:
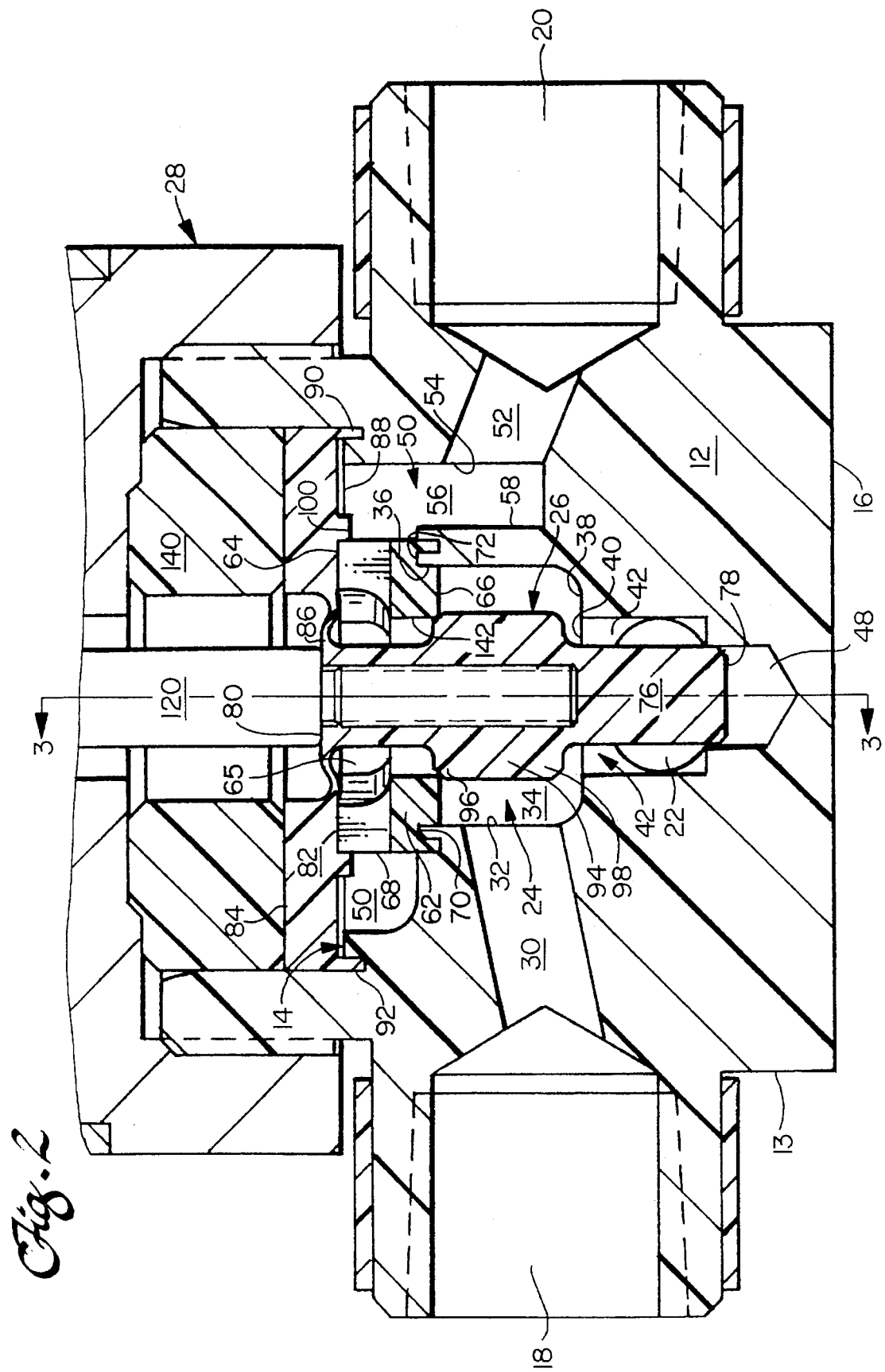
FIG. 2 is a semi-schematic cross-sectional fragmentary side view of the valve apparatus of FIG. 1 illustrating a valve body.

Referring to FIGS. 1 and 2, there are shown semi-schematic, cross-sectional side views of a preferred embodiment of a valve apparatus 10 provided in accordance with practice of the present invention. The positioning and orientation of the components of the valve apparatus 10 relative to each other is described below as they are shown in the drawings. Generally speaking, the valve apparatus comprises a valve body 12 having an open top end 14 near the top of the body and a closed bottom end 16 near the bottom of the body. An inlet port 18 is through the side of the valve body 12 at a first location. A first outlet port 20 is through the side of the valve body 12 at a second location. A second outlet port 22 is through the side of the valve body 12 at a third location (also shown in FIG. 3).

A cylindrical valve chamber 24 is located in a central region of the valve body 12 and is in communication with the inlet port 18, the first outlet port 20, and the second outlet port 22. A poppet assembly 26 is disposed axially within the valve chamber. The poppet assembly is displaced axially within the chamber by an actuator assembly 28 (shown in FIG. 1) mounted to the top end 14 of the valve body 12. The actuator assembly, its connection to the valve body, and its operation to effect axial displacement of the poppet assembly is discussed in greater detail below.

Referring to FIG. 2, the valve body 12 may have an outside wall surface 13 configured in a number of different shapes such as cylindrical, square, hexagonal, octagonal or the like when viewed in horizontal cross section. In a preferred embodiment, the valve body has an octagonal configuration having an outside diameter of approximately 38 millimeters (1½ inches).

The inlet 18 and first and second outlets 20 and 22, respectively, are spaced radially apart from each other around the periphery of the valve body and are positioned near the center of its height. In the illustrated embodiment, the inlet port 18 and first outlet port 20 are positioned at diametrically opposed sides of the valve body, i.e., 180 degrees apart, and the second outlet 22 is positioned between the inlet and first outlet ports, i.e., 90 degrees with respect to both the inlet and first outlet ports (best seen in FIG. 4). It is to be understood that other spacings and positions of the inlet and first and second outlet parts can be used, if desired. For example, the valve body can be configured having the first and second outlet ports positioned at diametrically opposed locations, i.e., 180 degrees apart, with the inlet port interposed between both outlet ports, i.e., 90 degrees from both outlet ports. The inlet and outlet ports are each configured having threaded wall portions to accommodate threaded connection with piping or tubing for carrying liquids or gases to and away from the valve. In a preferred embodiment, the inlet and outlet ports have an inside diameter of approximately 13 millimeters (½ inch).

The inlet port 18 empties into the vertically extending generally cylindrical valve chamber 24. The chamber has an axis perpendicular to the inlet port and extends from the top end 14 to a position near the bottom end 16 of the valve body. In a preferred embodiment, the valve chamber has a length of approximately 23 millimeters (⅞ inches). An inlet transport passage 30 extends through the valve body and connects the inlet port 18 to the valve chamber 24. The inlet transport passage has a diameter smaller than the inlet port and passes through the valve body with a slightly upward angle of departure as taken from an axis along the inlet port. Accordingly, the inlet transport passage enters the valve chamber 24 at a location above the axis of the inlet port. The inlet transport passage enters through a side wall 32 of a central portion 34 of the valve chamber 24.

The central portion of the valve chamber has a cylindrical configuration and comprises an open end 36 at its top and a partially closed end 38 at its bottom, wherein the top and bottom end are separated by a cylindrical side wall 32. In a preferred embodiment, the distance between the open end 36 and the partially closed end 38 is approximately 8 millimeters (5/16 inch). The inlet transport passage 30 enters the side wall 32 at a location approximately midway between the open and partially closed ends 36 and 38, respectively. A first valve seat 40 extends circumferentially around the partially closed end 38 of the central portion 34 and faces toward the top end 14 of the valve body 12.

Figure 3:
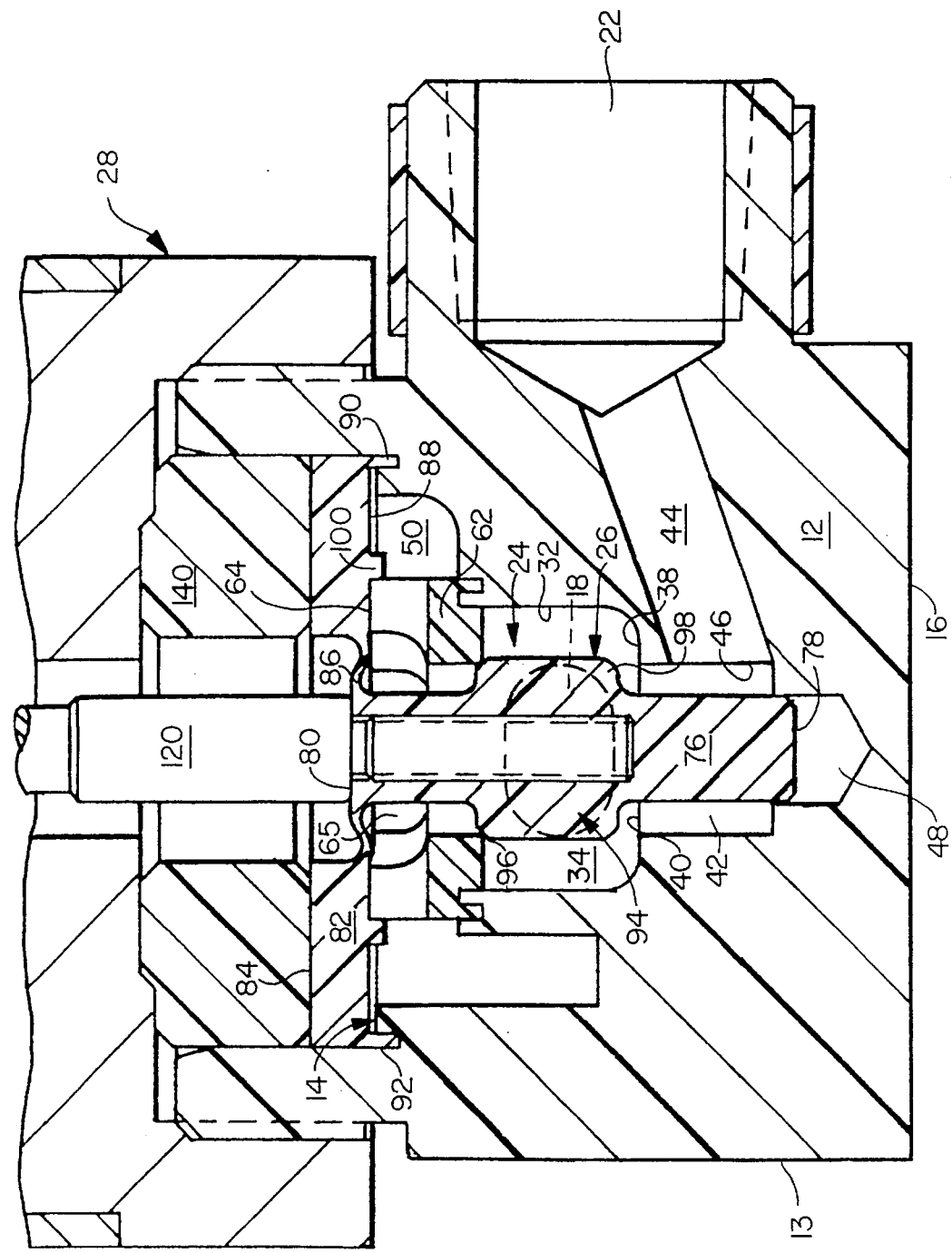
FIG. 3 is a semi-schematic cross-sectional fragmentary side view of the valve body taken along line 3—3 of FIG. 2.
Figure 4:
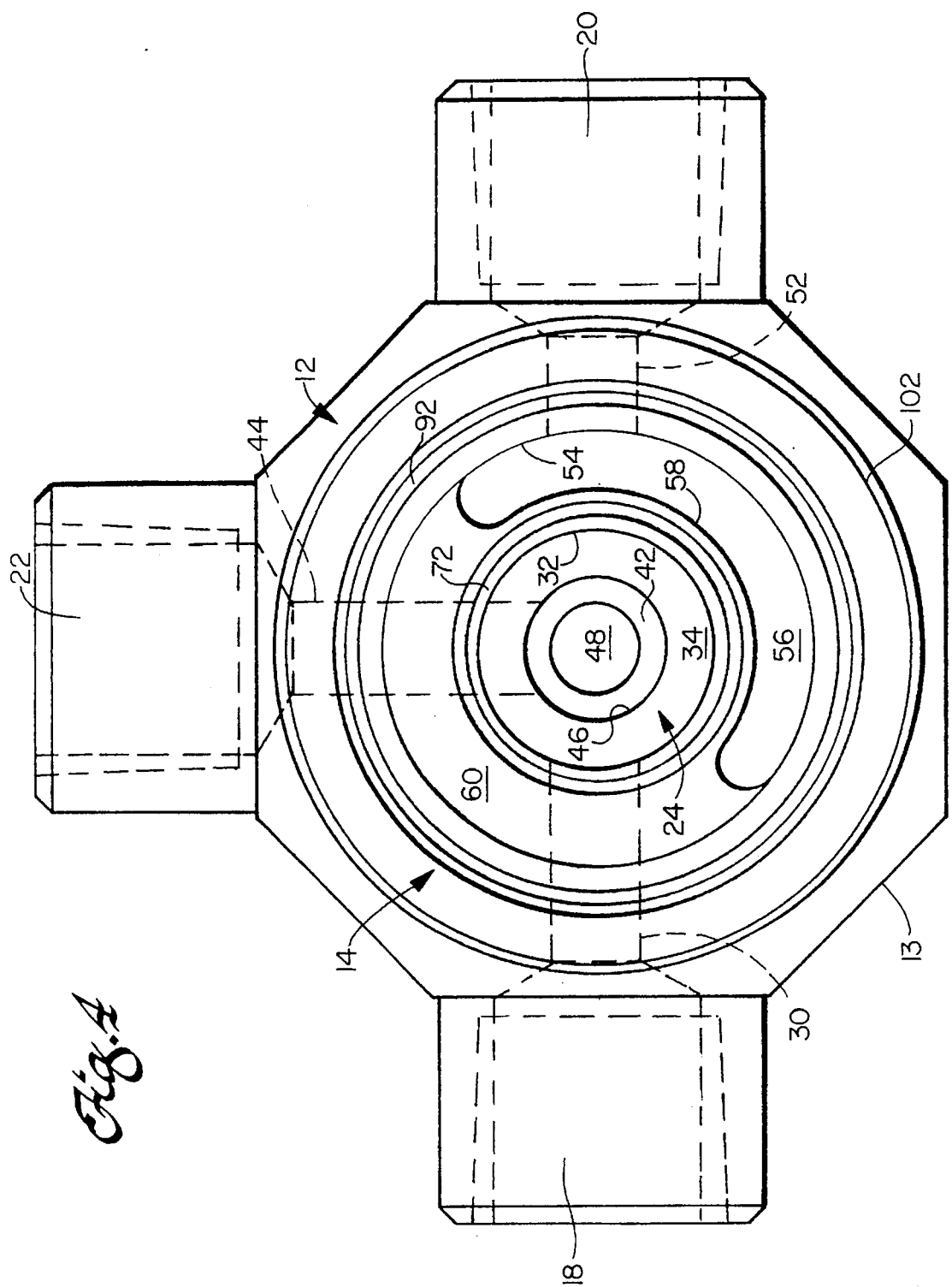
FIG. 4 is a top plan view of the valve body of FIGS. 1–3.

The second outlet port 22 is connected to a lower portion 42 of the cylindrical valve chamber 24 that extends from the partially closed end 38 of the central portion 34 to a position adjacent the bottom end 16 of the valve body. The lower portion 42 has a generally cylindrical configuration and, in a preferred embodiment, extends vertically within the valve chamber 24 a distance of approximately 10 millimeters (⅜ inches). As best shown in FIGS. 3 and 4, a second outlet transport passage 44 extends through the valve body and connects the second outlet port 22 to the lower portion 42 of the valve chamber 24. Referring now particularly to FIG. 3, the second outlet transport passage 44 has a diameter smaller than the second outlet port and passes through the valve body with a slightly downward angle of departure as taken from an axis along the second outlet port 22. Accordingly, the second outlet transport passage enters the lower portion 42 of the valve chamber at a location below the axis of the second outlet port. The second outlet transport passage enters the valve chamber through a side wall 46 defining the lower portion 42 at the center of the lower portion, between the partially closed end 38 of the central portion 34 and the bottom end 16 of the valve body.

Referring now to FIGS. 2 and 3, the valve chamber lower portion 42 comprises a stem opening 48 having a generally cylindrical configuration that extends vertically within the lower portion adjacent the valve body bottom end 16. The stem opening has a diameter similar to that of a valve stem that resides within the valve chamber, as will be discussed in greater detail below. The stem opening serves to align the valve stem within the chamber and to accommodate slidable axial displacement of the same therein.

Referring to FIG. 2, the first outlet port 20 is connected to an upper portion 50 of the valve chamber 24. The upper portion 50 has a generally cylindrical configuration and extends vertically from the open end 36 of the central portion 34 to the top end 14 of the valve body. In a preferred embodiment, the upper portion 50 extends a length of approximately 5 millimeters (3/16 inch). A first outlet transport passage 52 extends through a side wall 54 defining the upper portion 50 of the valve chamber and provides fluid flow communication between the first outlet port 20 and the upper portion of the valve chamber 50. As best shown in FIGS. 1 and 2, the first outlet transport passage 52 is smaller in diameter than the first outlet port 20 and passes through the valve body 12 with a slightly upward angle of departure as taken from an axis along the first outlet port. Accordingly, the first outlet transport passage 52 enters the upper portion 50 of the valve chamber at a location above the axis of the first outlet port.

As best seen in FIG. 2, the upper portion 50 comprises a channel 56 defined along an outside surface by the side wall 54 and along an inside surface by a chamber wall 58. The chamber wall 58 is disposed axially within the valve chamber and extends vertically between the central and upper chamber portions. In a preferred embodiment, the channel extends vertically approximately 13 millimeters (½ inch). As best shown in FIG. 4, the channel 56 extends concentrically around the valve chamber from a position that includes the first outlet transport passage 52 a predetermined distance toward but not including the inlet transport passage 30. In a preferred embodiment, the channel extends concentrically in a semi-circular shape of approximately 180 degrees within the valve chamber. Referring now to FIG. 2, the portion of the valve body diametrically opposite to the channel 56, i.e., the remaining 180 degrees extending concentrically from the inlet port 18 to the second outlet port 20, comprises a solid portion of the valve body 12 which extends vertically from the valve chamber central portion 34 to its upper portion 50 and has a planer top surface 60 adjacent the open end 36 of the central portion 34.

Figure 5:
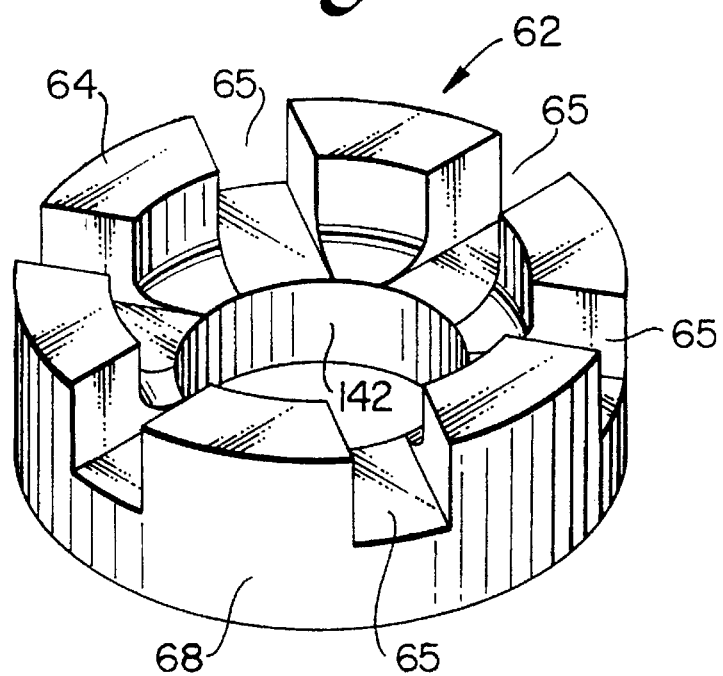
FIG. 5 is a perspective top view of a second valve seat used in the valve apparatus of FIGS. 1–4.
Figure 6:
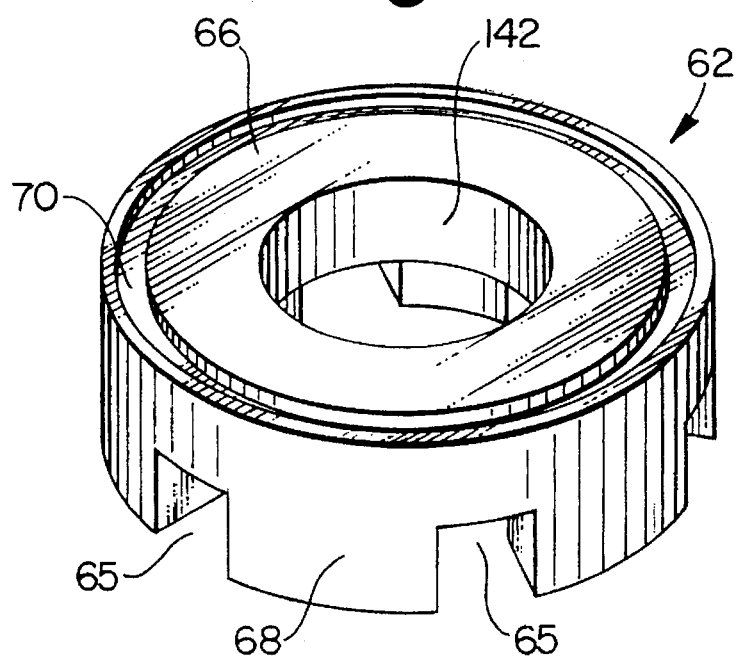
FIG. 6 is a perspective bottom view of the second valve seat of FIG. 5.
Figure 7:
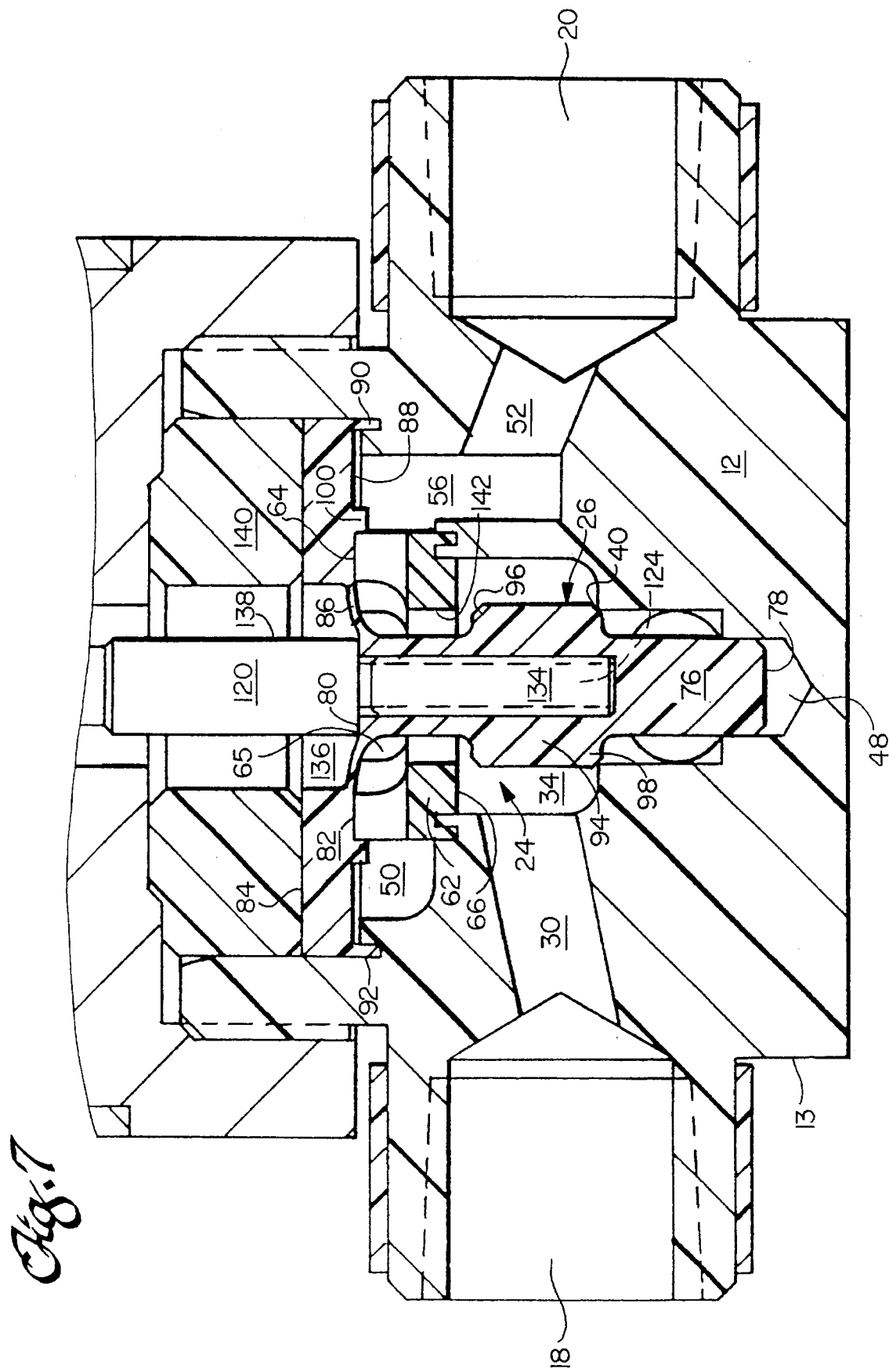
FIG. 7 is a schematic cross-sectional fragmentary side view of the valve body of FIGS. 1–4 in a second operating condition.

Referring to FIGS. 2, 3 and 7, a second valve seat 62 is disposed around the open end 36 of the central portion 34 and faces the bottom end 16 of the valve body. The second valve seat is separate from and not integral with the valve body. As best shown in FIGS. 5 and 6, the second valve seat 62 has a generally cylindrical configuration with an open end 64 at one end of the seat and a partially closed end 66 at an opposite end of the seat, wherein the open and partially closed ends 64 and 66, respectively, are separated by a cylindrical wall 68. In a preferred embodiment, the cylindrical wall 68 has an outside diameter of approximately 16 millimeters (⅝ inch) and extends between the open and partially closed end a distance of approximately 5 millimeters (3/16 inch). As best seen in FIG. 6, the partially closed end 66 comprises a groove 70 disposed circumferentially a predetermined depth within the partially closed end adjacent a peripheral edge of the wall 68. The groove 70 is configured to complement and accommodate placement of a ridge 72 formed in the valve body, thereby forming a tongue and groove-type fitting arrangement. The ridge 72 is positioned at the open end 36 of the valve chamber central portion 34 and extends circumferentially therearound. The placement of the partially closed end 66 of the second valve seat 62 on the open end 36 of the valve chamber central portion 34 forms an air and liquid-tight seal between the wall 32 of the valve chamber central portion 34 and the partially closed end 66 of the second valve seat 60.

As best seen in FIG. 5, the open end 64 of the second valve seat comprises a plurality of openings 65 through the cylindrical wall 68. The openings 65 serve to accommodate air or liquid transfer from the inlet port 18 to the first outlet port 20, as will be discussed in greater detail below.

Referring now to FIGS. 2 and 3, the poppet assembly 26 is housed within the valve body 12 and comprises a valve stem 76 disposed vertically within the valve chamber 24, i.e., the valve stem is positioned with its axis parallel to the axis of the valve chamber. The valve stem comprises a first end 78 at the bottom of the poppet assembly positioned adjacent the bottom end 16 of the valve body, and a second end 80 at the top of the poppet assembly positioned adjacent the top end 14 of the valve body. In a preferred embodiment, the valve stem has a length of approximately 19 millimeters (¾ inch). The first end 78 is housed within the stem opening 48 of the lower portion 42 of the valve chamber and is sized to facilitate axial upward and downward displacement within the stem opening. The second end 80 comprises a diaphragm 82 that is integral with the valve stem 76. The diaphragm 82 comprises a circular disk-shaped top side surface 84 having a centrally located deformable portion 86 integral with the valve stem. In a preferred embodiment, the diaphragm has a diameter of approximately 25 millimeters (1 inch).

The diaphragm 82 is positioned over the top end 14 of the valve body with a bottom surface 88 facing the bottom end 16. The diaphragm 82 includes a lip 90 that extends downwardly from the bottom surface circumferentially around a peripheral edge that defines the outside diameter of the diaphragm. The lip 90 is configured to be placed within a groove 92 that extends circumferentially around the top end 14 of the valve body. The diaphragm lip 90 fits within the groove 92 to form an air and liquid-tight seal between the upper portion 50 of the valve chamber and the top end 14 of the valve body.

The valve stem 76 comprises an enlarged diameter section 94 integral with the valve stem that extends radially away from the stem a predetermined distance and is positioned between the first or bottom end 78 and the second or top end 80. In a preferred embodiment, the enlarged diameter section 94 has a diameter of approximately 8 millimeters (⁵⁄₁₆ inch) and has an axial length of approximately 6 millimeters (¼ inch). The enlarged diameter section is disposed within the central portion 34 of the valve chamber 24 between the first valve seat 40 and the second valve seat 62. The enlarged diameter section 94 comprises an upper shoulder 96 positioned adjacent the second end 80, and a lower shoulder 98 positioned adjacent the first end 78, to accommodate sealing engagement with adjacent second and first valve seats 62 and 40, respectively.

Referring to FIGS. 2, 3 and 7, the second valve seat 62 is disposed around the valve stem 76 between the upper shoulder 96 and the diaphragm 82. The diaphragm includes a circular ridge 100 on the bottom surface 88 of sufficient diameter to accommodate the placement of the open end 64 of the second valve seat therein. The ridge serves to facilitate alignment of the second valve seat about the bottom surface 88 of the diaphragm.

Figure 8:
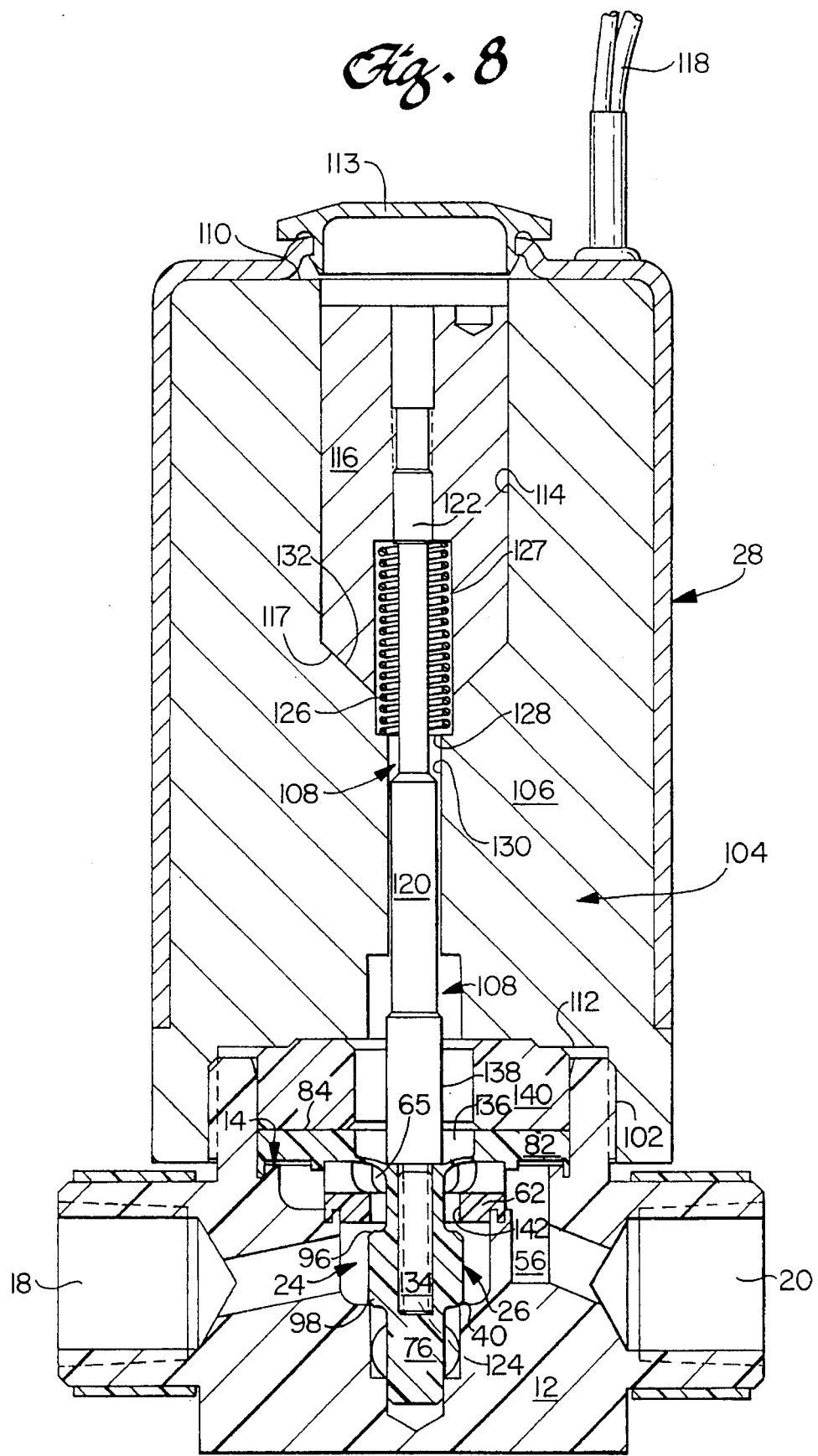
FIG. 8 is a schematic cross-sectional side view of the valve apparatus including the valve body of FIG. 7.

Referring now to FIG. 8, the actuator assembly 28 is positioned adjacent the top end 14 of the valve body. The actuator assembly is threadably attached about a threaded portion of an outside wall 102 extending along the top end. The actuator assembly includes an actuator 104 that operates to axially displace the poppet assembly 26 within the valve chamber 24 between a first position, with the lower shoulder 98 compressively engaged with the first valve seat 40 (also as shown in FIG. 7), and a second position, with the upper shoulder 96 compressively engaged with the second valve seat 62 (as shown in FIGS. 1, 2 and 3). The type of actuator may be selected from the group of conventionally operated actuators including electrically, pneumatically, or manually operated actuators. In a preferred embodiment, the actuator 104 is a standard electrical solenoid.

The electrical solenoid 104 comprises an electro-magnet 106 having a cylindrical configuration and a centrally located cavity 108 extending along an axis of the electromagnet from a first or top end 110 at the top of the actuator assembly 28 to a second or bottom end 112 at the bottom of the actuator assembly adjacent the valve body top end 14 of the valve body 12. The cavity 108 comprises an enlarged diameter section 114 near the first end 110 that accommodates slidable placement of a piston 116 therein. The piston is axially displacable within the enlarged section 114 in response to the application of electricity to the electromagnet 104 via wires 118. A cap 113 is attached to the actuator assembly 28 at the first end 110. An actuating rod 120 is threadably attached to the piston 116 at one end 122 and is threadably attached to the poppet assembly 26 at an opposite end 124. In a preferred embodiment, the actuating rod has a length of approximately 70 millimeters (2 ¾ inch).

A spring 126 is disposed within a spring cavity 127 of the piston 116 and is interposed between the piston 116 and a neck portion 128 of the cavity 108. The cavity 108 includes a reduced diameter portion 130 that extends axially from the neck portion to a position adjacent the second or bottom end 112 of the electromagnet 106. The spring 126 serves to maintain the piston 116 at a position within the enlarged diameter section 114 such that a leading surface 117 of the piston is remote from an adjacent portion 132 of the electromagnet when the electromagnet is not activated, as shown in FIG. 1. In this position, the spring imposes a sufficient upwardly directed force on the poppet assembly to cause the valve poppet upper shoulder 96 to compressively engage the second valve seat 62. As will be discussed in greater detail below, the position of the piston as shown in FIG. 1 corresponds to the second position of the poppet assembly 26 vis-a-vis the valve chamber.

Referring to FIGS. 7 and 8, the poppet assembly 26 comprises a central cavity 134 that extends axially through the valve stem 76 a predetermined distance from the top end 80 toward the bottom end 78. The central cavity 134 is threaded to accommodate threaded engagement with bottom end 124 of the actuating rod 120 therein. The diaphragm 82 comprises a centrally located circular recessed portion 136 at the top surface 84 in axial alignment with the valve stem central cavity 134 to accommodate placement of a shoulder section 138 of the actuating rod therein.

A donut-shaped spacer 140 is interposed between the actuator 104 and the top surface 84 of the diaphragm 82. The spacer 140 serves to transmit a compressive force from the actuator onto the disk-shaped surface 84 of the diaphragm to both effect an air and liquid-tight seal between the diaphragm and the upper portion 50 of the valve chamber 24, and to prevent axial movement of the diaphragm during upwardly and downwardly directed operation of the actuating rod 120 and axial displacement of the poppet assembly 26 thereby. Accordingly, the actuating rod 120 extends from the piston 116, through the cavity 108, through the spacer 140, through the recessed portion 136 of the diaphragm and into the cavity 134 of the valve stem 76, for threaded connection of its threaded bottom end 124 with the cavity 134.

Referring to FIG. 1, the actuator 104 is illustrated in its deactivated state, wherein spring 126 imposes an upwardly directed compression force against the piston 116 that is transmitted to the actuating rod 120, placing the poppet assembly 26 into its "second position" with the upper shoulder 96 compressively engaged against the second valve seat 62. In this second position (as can be seen by referring to FIGS. 2 and 3 in addition to FIG. 1), air or liquid entering the inlet port 18 flows into the central portion 34 of the valve chamber and is directed to the second outlet port 22 for distribution to a desired fluid-handling device. The action of the upper shoulder 96 against the second valve seat 62 prohibits the flow of air or liquid from the inlet port to enter the upper portion 50 of the valve chamber 24, and thus preventing it from being routed to the first outlet port 20.

Referring now to FIG. 8, the valve apparatus is shown with the actuator 104 in the activated state wherein electricity is routed to the electromagnet 106, causing the leading surface 117 of the piston 116 to engage the adjacent portion 132 of the electromagnet and axially displace the actuating rod 120 in a downward direction to place the poppet assembly 26 in what is called herein the "first position" within valve chamber 24 with the lower shoulder 98 compressively engaged with the first valve seat 40. In this position (as can best be seen by referring to FIG. 7 in addition to FIG. 8) air or liquid entering the inlet port 18 is caused to flow into the central portion 34 of the valve chamber 24, past the upper shoulder 96 and second valve seat 62, through the openings 65, into the upper portion 50 of the valve chamber. The air or liquid entering the upper chamber flows through the channel 56, first outlet transport passage 52 and first outlet port 20, and to a desired fluid-handling device.

A key feature of this invention is that the valve apparatus as described and illustrated consists of only four essential components, the valve body 12, the second valve seat 62, the poppet assembly 26, and the actuator assembly 28. The remaining elements making up the valve apparatus are either integral with or a subgroup of one of the above-identified components. Constructing a valve apparatus having a minimum number of nonintegral components is desired because it inherently reduces the number of leak paths that the air or liquid within the valve can take to escape into the environment. Conventional three-way valves comprise a dual diaphragm arrangement wherein each diaphragm is not an integral member of the valve stem. Such valves comprise four leak paths, one leak path between each diaphragm and each opposing end of the valve stem, and one leak path between each diaphragm and each opposing valve body wall surface. In contrast, the valve apparatus constructed according to principles of this invention comprises only one diaphragm integral with the valve stem, hence only one leak path between the diaphragm and the valve body wall surface. Reducing the number of leak paths enhances the dependability of the valve, reducing the potential for valve failure and, thus reducing the potential that a potentially hazardous chemical may be leaked to the environment.

The valve body 12, second valve seat 62, and poppet assembly 26 are preferably made from a material that displays properties of good chemical and thermal resistance. Such properties are desirable if the valve is to be used in the semiconductor manufacturing industry or in any other industry where corrosive chemicals are to be passed through the valve or where it is desirable that a high degree of chemical purity of the process chemical passed through the valve be maintained. In the semiconductor manufacturing industry, highly corrosive process chemicals such as strong inorganic acids, strong inorganic bases, strong solvents, and peroxides are used during the etching operation and are oftentimes heated to enhance the etching action of the chemicals, and thus enhance the efficiency of the etching operation. It is, therefore, important that a valve used to distribute the flow of such process chemicals be both chemically and thermally resistant to provide dependable operation without the potential for valve failure, which may result in leakage of the corrosive chemicals and associated vapors from the valve, where it could cause a hazard to the environment and/or a danger to nearby operators.

Additionally, it is important that the valve be chemically resistant so that it will not degrade upon contact with the process chemicals and introduce contamination into chemically pure process liquids. The introduction of such contaminants may cause hundreds of thousands of dollars of damage to a batch of semiconductors undergoing treatment with such process chemicals.

In a preferred embodiment, the valve body, second valve seat, and poppet assembly are constructed from a fluoropolymer compound selected from the group of fluoropolymers including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. A particularly preferred material is Teflon (a registered trademark) PFA or Teflon FEP, which are provided by DuPont Company of Wilmington, Del. Such materials are not damaged by corrosive, acidic, or caustic liquids and do not introduce contamination into chemically pure liquids.

The valve apparatus can be used to control the distribution of either liquid or gas through valve chamber to one of the outlet ports. The valve apparatus is capable of operating reliably at temperature conditions of up to 100° C., and pressure conditions of up to 120 psig.

A feature which enables the valve apparatus to be provided with only four total components, including only three valve components per se, is that the poppet assembly and diaphragm are constructed as integral members. Accordingly, during the assembly of the valve apparatus the second valve seat is installed into the valve chamber and the poppet assembly is inserted through the partially closed end 66 so that the second valve seat is disposed between the diaphragm and the upper shoulder portion 76 of the poppet assembly. The installation of the poppet assembly through the second valve seat is possible because of the respective diameters of a stem opening 142 in the second valve seat (best seen in FIGS. 5 and 6) and the enlarged diameter section 94 of the valve stem are of sufficient dimension to accommodate placement of the enlarged portion through the stem opening during the installation of the poppet assembly into the valve chamber.

Referring now to FIGS. 2, 7 and 8, the valve apparatus is assembled by inserting the enlarged diameter section 94 of the valve stem 76 through the stem opening 142 in the second valve seat 62. Because the stem opening is necessarily smaller in diameter than the enlarged diameter section for purposes of accommodating sealing engagement with the upper shoulder 96, it is necessary that the enlarged diameter section 94 be forcibly inserted through the stem opening during installation. In one embodiment, the second valve seat is heated, thereby expanding the stem opening sufficiently so that the enlarged diameter section can be inserted therethrough. In another embodiment, the poppet assembly and the enlarged diameter section are chilled, thereby enabling it to contract sufficiently so that the enlarged diameter section can be inserted through the stem opening. In another embodiment, the second valve seat is heated and the poppet assembly is chilled, further facilitating the insertion of the enlarged diameter section through the stem opening.

The installation of the enlarged diameter section through the stem opening of the second valve seat using the above-described embodiments is facilitated by forming the second valve seat and poppet assembly from a material having a high coefficient of thermal expansion, and preferably from a material selected from the group of fluoropolymer materials described above. The use of a fluoropolymer material having a high coefficient of thermal expansion to form the second valve seat and poppet assembly allows the stem opening to expand to a large degree when subjected to heating temperatures, and allows the enlarged diameter section to contract to a large degree. when subjected to cooling temperatures. This large degree of second valve seat expansion and poppet assembly contraction acts to facilitate passage of the enlarged diameter section through the stem opening. Accordingly, a second valve seat and poppet assembly formed from a fluoropolymer material having a high coefficient of thermal expansion facilitates efficient assembly of the valve apparatus because a smaller temperature change, i.e., heating the second valve seat or cooling the poppet assembly, is needed to accommodate placement of the enlarged diameter section through the stem opening.

In still another embodiment, a lubricant such as isopropyl alcohol and the like is used on the poppet assembly and the second valve seat to facilitate insertion of the enlarged diameter section through the stem opening.

Regardless of which of the above-described embodiments are used to install the poppet assembly, the respective diameters of the stem opening 142 and enlarged diameter section 94 are such that forcible installation can be achieved without adversely affecting the ability of second valve seat to provide an air and liquid-tight seal between the upper shoulder 96 and the second seat 62 after the poppet assembly has been installed within the valve chamber.

Although limited embodiments of the valve apparatus have been specifically described and illustrated herein, many modifications and variations will be apparent to those skilled in the art. For example, a valve apparatus can be constructed to accommodate two inlet flows and control the dispensement of fluid through the valve from either or the other inlet to a single outlet without departing from the scope of this invention. In such an embodiment, the flow would be the reverse of that described in the preferred embodiment and each inlet flow would enter the valve body via respective first and second outlet ports 20 and 22. When the poppet assembly is axially displaced in the "first position" fluid would flow from the first outlet port 22, through the valve chamber 26 and to the inlet port 18. When the poppet assembly is axially displaced in the "second position" fluid would flow from the second outlet port 22, through the valve chamber 26 and to the inlet port 18.

Referring now to FIG. 9, the valve apparatus can also be constructed as a three-piece assembly comprising the valve body 12, the poppet assembly 26 and the actuator assembly 28, wherein the second valve seat 62 is an integral member of the valve body. Accordingly, without including the actuator assembly, such an embodiment of the valve apparatus consists of only two essential elements, the valve body 12 and the poppet assembly 26. Such an embodiment of the valve apparatus is feasible when the sizes of the valve body, and size of the inlet and outlet ports, are of sufficient size to accommodate placement of machining tools therethrough to permit the formation of the second valve seat from an integral portion of the valve body. For example, a valve body comprising inlet and outlet ports having a diameter of about one inch would provide a sufficient amount of clearance to facilitate machining of the second valve seat. The integral second valve seat would be the same as the nonintegral second valve seat previously described and illustrated in all other respects to facilitate flow from the inlet port 18 to the first outlet port 20. A valve apparatus configured in this manner would be advantageous in that it would eliminate a possible fluid leak path within the valve, from the central portion 34 of the valve chamber 24 to the upper portion 50 when the poppet assembly 26 is placed in the second position, i.e., with the upper portion 96 of the enlarged diameter section 96 of the valve stem 76 engaged against the second valve seat 62.

Accordingly, it is to be understood that, within the scope of the appended claims, the valve apparatus according to principles of this invention may be embodied other than as specifically described herein.

What is claimed is:

1. A three-way valve consisting essentially of four components including:

a one-piece valve body having a top end and a bottom end, the valve body comprising:
an inlet port and first and second outlet ports disposed between the top and bottom ends;
a valve chamber centrally located in an axial position within the valve body;
a first valve seat formed integrally with the valve chamber facing toward the top end of the valve body and located between the inlet port and the second outlet port;

a second valve seat formed separately from the valve body and mounted in the valve chamber at a position above the first valve seat, the second valve seat facing the bottom end and located between the inlet port and the first outlet port;

a poppet assembly formed separately from the valve body and mounted for axial movement within the valve chamber, the poppet assembly comprising:
a valve stem having an enlarged diameter section between its top and bottom end portions; and
a diaphragm formed integrally with its top end and extending radially therefrom, the diaphragm having a peripheral edge that forms an air and liquid-tight seal against a side wall of said valve chamber, the enlarged diameter section of the valve stem located between the first and second valve seats and comprising a lower shoulder for engaging the first valve seat when in a first axial position within the valve chamber, and an upper shoulder for engaging the second valve seat when in a second axial position within the valve chamber; and means for moving the poppet assembly between the first and second positions.

2. The three-way valve as recited in claim 1 wherein the second valve seat is disposed around the poppet assembly at a location between the poppet assembly diaphragm and the valve stem upper shoulder, the respective diameters of the second valve seat and the enlarged portion of the valve stem being of sufficient dimension to accommodate placement of the enlarged portion through the second valve seat during installation of the poppet assembly into the valve chamber, and to provide sealing interaction after installation by displacement of the poppet assembly to the second position.

3. The three-way valve as recited in claim 2 wherein the second valve seat comprises a plurality of openings located near a peripheral edge of the second seat remote from the upper shoulder and adjacent the diaphragm, the openings providing a fluid flow distribution through the valve chamber from the inlet port to the first outlet port when the poppet assembly is in the first position.

4. The three-way valve as recited in claim 1 wherein the valve body, poppet assembly, and second valve seat are each formed from a fluoropolymer material.

5. The three-way valve as recited in claim 4 wherein the valve body is formed by a molding process.

6. The three-way valve as recited in claim 1 wherein the first position of the poppet assembly within the valve chamber provides fluid flow distribution through the valve chamber from the inlet port to the first outlet port.

7. The three-way valve as recited in claim 1 wherein the second position of the poppet assembly within the valve chamber provides fluid flow distribution through the valve chamber from the inlet port to the second outlet port.

8. The three-way valve as recited in claim 1 wherein the means for moving the poppet assembly between the first and second positions comprises:

an actuating rod connected at one end to the poppet assembly; and an actuator for displacing the rod in a direction parallel to an axis of the valve chamber a sufficient distance to move the poppet assembly within the chamber between the first and second positions.

9. The three-way valve as recited in claim 8 wherein the actuator is selected from the group consisting of electric, pneumatic, hydraulic and manual actuation.

10. A valve apparatus comprising:

a one-piece valve body having an open top end at a top portion and a closed bottom end at a bottom portion, the valve body comprising:

a valve chamber disposed through the body and extending between the top and bottom ends;

an inlet port disposed within the body oriented perpendicular to an axis along the chamber and in communication with the chamber;

first and second outlet ports remote from the inlet port, each outlet port being disposed within the body oriented perpendicular to the axis of the chamber and in communication with the chamber;

a first valve seat integral with the valve body disposed within the chamber and facing the top end of the valve body, the first valve seat being positioned between the inlet port and the second outlet port;

a second valve seat separate from the valve body mounted within the valve chamber adjacent the top end and facing the bottom end of the valve body, the second valve seat being positioned between the inlet port and the first outlet port;

a poppet assembly disposed within the valve chamber comprising:

a valve stem oriented with its axis parallel to the axis of the valve chamber, the valve stem having a first end positioned adjacent the top end of the valve body and a second end positioned adjacent the bottom end of the body;

an enlarged diameter section integral with the valve stem disposed between the first and second end, the enlarged diameter section having an upper shoulder positioned adjacent the second valve seat and a lower shoulder positioned adjacent the first valve seat;

a diaphragm integral with the valve stem and disposed at the first end, the diaphragm being mounted over the top end of the valve body and having a peripheral edge attached to a side wall of the valve chamber to form an air- and liquid-tight seal therebetween, wherein the second valve seat is interposed between the upper shoulder and the diaphragm; and means attached to the poppet assembly for moving the poppet assembly in the valve chamber between a first position, wherein the lower shoulder is in air- and liquid-tight engagement with the first valve seat, and a second position, wherein the upper shoulder is in air- and liquid-tight engagement with the second valve seat.

11. The valve apparatus as recited in claim 10 wherein the second valve seat is fixedly interposed within the valve chamber between a bottom surface of the diaphragm and a complementary surface of the valve body.

12. The valve apparatus as recited in claim 11 wherein the second valve seat comprises a plurality of openings located adjacent the bottom surface of the diaphragm.

13. The valve apparatus as recited in claim 12 comprising a flow pathway extending through the valve chamber from the inlet port through the plurality of openings and to the first outlet port, wherein the pathway is created by the placement of the poppet assembly in the first position within the valve chamber.

14. The valve apparatus as recited in claim 10 comprising a flow pathway extending through the valve chamber from the inlet port and to the second outlet port, wherein the pathway is created by the placement of the poppet assembly in the second position within the valve chamber.

15. The valve apparatus as recited in claim wherein the valve body, second valve seat, and poppet assembly are each made from a fluoropolymer composition.

16. The valve apparatus as recited in claim 15 wherein the valve body, second valve seat, and poppet assembly are each formed by a molding process.

17. The valve apparatus as recited in claim 10 wherein the respective dimensions of the enlarged diameter section of the valve stem and the second valve seat are sufficient to both accommodate placement of the enlarged diameter section through the second valve seat during installation of the poppet assembly into the valve chamber, and to accommodate sealing engagement of the upper shoulder against the second valve seat when the poppet assembly is placed in the second position within the valve chamber.

18. The valve apparatus as recited in claim 17 wherein the second valve seat is formed from a material having a high coefficient of thermal expansion for facilitating placement of the enlarged diameter section through the second valve seat by heating the second valve seat.

19. The valve apparatus as recited in claim 10 wherein the means for moving the poppet assembly in the valve chamber comprises:

an actuating rod attached at one end to the poppet assembly; and an actuator attached to an opposite end of the rod for axially displacing the rod and poppet within the valve chamber between the first and second positions, the actuator being mounted to the top end of the valve body.

20. The valve apparatus as recited in claim 19 wherein the type of activating mechanism used to operate the actuator is selected from the group consisting of an electric, a pneumatic, a hydraulic, and a manual mechanism.

21. The valve apparatus as recited in claim 19 wherein the means for moving the poppet assembly further comprises a spacer interposed between a top surface of the diaphragm and the actuator, wherein the spacer comprises a central opening to accommodate the placement of the rod therethrough and serves to restrict axial movement of the diaphragm during movement of the poppet assembly.

22. A valve apparatus consisting of four essential components comprising:

a valve body having an open top end and a closed bottom end, the valve body comprising;
- a valve chamber integral with the valve body and disposed axially between the top and bottom ends;
- an inlet port integral with the valve body and in communication with a central portion of the valve chamber;
- a first outlet port integral with the valve body and in communication with an upper portion of the valve chamber adjacent the top end;
- a second outlet port integral with the valve body and in communication with a lower portion of the valve chamber adjacent the bottom end;
- a first valve seat integral with the valve body disposed within the valve chamber between the inlet port and the second outlet port;

a poppet assembly disposed within the valve chamber comprising:
- a valve stem having a bottom end oriented adjacent the bottom end of the valve body and a top end oriented adjacent the top end of the valve body;
- an enlarged diameter section integral with the stem disposed between the valve stem top and bottom ends, wherein the enlarged section has an upper shoulder adjacent the top end of the valve stem and a lower shoulder adjacent the bottom end of the valve stem;
- a diaphragm integral with the valve stem disposed near the top end of the valve stem and mounted near the valve body top end, the diaphragm having a peripheral edge in contact with the valve chamber to form an air- and liquid-tight seal therebetween;

a second valve seat formed separately from the valve body and poppet assembly, wherein the second valve seat is mounted within the valve chamber between the inlet port and the first outlet port and is disposed around the valve stem between the diaphragm and the upper shoulder, the second valve seat comprising a plurality of openings adjacent the diaphragm to accommodate flow from the valve chamber to the first outlet; and means attached to the poppet assembly for moving the poppet assembly within the valve chamber between a first position, where the lower shoulder is engaged with the first valve seat, and a second position, where the upper shoulder is engaged with the second valve seat.

23. The valve apparatus as recited in claim 22 wherein the means for moving the poppet assembly comprises an actuator attached to the top end of the valve body, and an actuating rod attached at one end to the actuator and attached at an opposite end to the poppet assembly, wherein activation of the actuator causes axial displacement of the rod within the actuator and axial movement of the valve stem within the valve chamber.

24. The valve apparatus as recited in claim 23 further comprising a spacer interposed between the diaphragm and the actuator to prevent the diaphragm from being axially displaced during axial movement of the valve stem.

25. The valve apparatus as recited in claim 22 comprising a flow pathway extending through the valve body from the inlet port, through the valve chamber and openings in the second valve seat, and to the first outlet port by the placement of the poppet assembly in the first position within the valve chamber.

26. The valve apparatus as recited in claim 25 comprising a flow pathway extending through the valve body from the inlet port, through the valve chamber, and to the second outlet port by the placement of the poppet assembly in the second position within the valve chamber.

27. A three-way valve consisting essentially of three components including:
- a one-piece valve body having a top end and a bottom end, the valve body comprising:
  - an inlet port and first and second outlet ports disposed between the top and bottom ends;
  - a valve chamber centrally located in an axial position within the valve body;
  - a first valve seat formed integrally with the valve chamber facing toward the top end of the valve body and located between the inlet port and the second outlet port;
  - a second valve seat integral with the valve chamber at a position above the first valve seat, the second valve seat facing the bottom end and located between the inlet port and the first outlet port;
- a poppet assembly formed separately from the valve body and mounted for axial movement within the valve chamber, the poppet assembly comprising:
  - a valve stem having an enlarged diameter section between its top and bottom end portions; and
  - a diaphragm formed integrally with its top end and extending radially therefrom to form a seal against a side wall of the valve chamber, the enlarged diameter section of the valve stem located between the first and second valve seats and comprising a lower shoulder for engaging the first valve seat when in a first axial position within the valve chamber, and an upper shoulder for engaging the second valve seat when in a second axial position within the valve chamber, wherein the bottom end portion of the valve stem is free and is not attached to the valve body; and
- means for moving the poppet assembly between the first and second axial positions.

* * * * *

UNITED STATES PATENT AND TRADEMARK OFFICE
CERTIFICATE OF CORRECTION

PATENT NO.  : 5,575,311
DATED       : November 19, 1996
INVENTOR(S) : Kenji Kingsford It is certified that error appears in the above-indentified patent and that said Letters Patent is hereby corrected as shown below:

Column 1, line 63, change "though" to -- through --.
Column 5, line 9, change "inches" to -- inch --.
Column 5, line 38, change "inches" to -- inch --.
Column 8, line 9, change "displacable" to -- displaceable --.
Column 8, line 16, change "inch" to -- inches --.
Column 10, line 25, after "through" insert -- the --.
Column 11, line 9, after "degree" change the period to a comma.
Column 11, line 29, change "air and liquid-tight seal" to
 -- air- and liquid-tight seal --.
Column 11, line 37, after "either" insert -- one --.
Column 11, line 58, after "when the" change "sizes" to -- size --.
Column 14, line 24, after "claim" insert -- 10 --.

Signed and Sealed this

Twelfth Day of August, 1997

*Attest:*

BRUCE LEHMAN

*Attesting Officer*     *Commissioner of Patents and Trademarks*